Patented Nov. 4, 1930

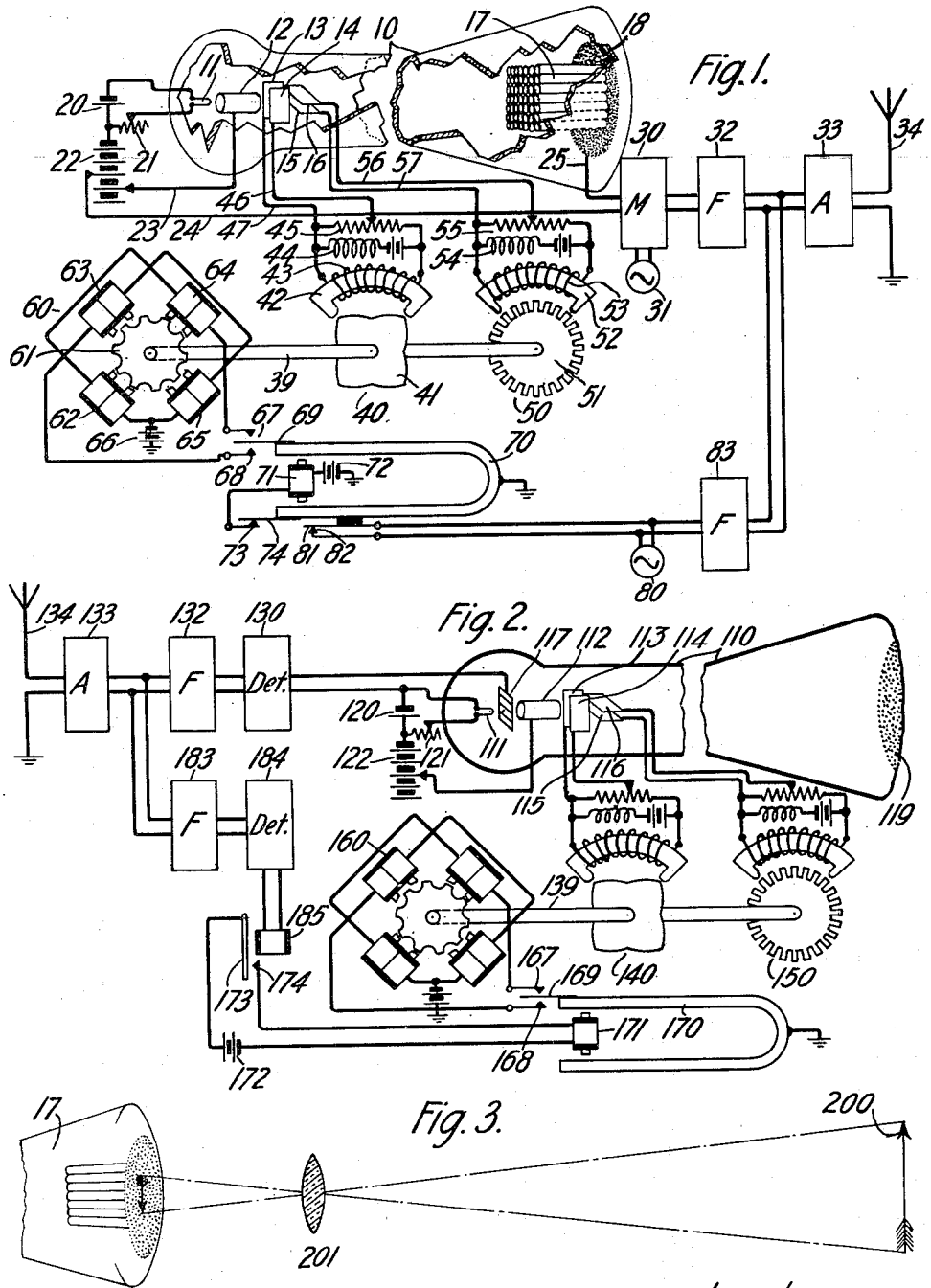

1,780,364

UNITED STATES PATENT OFFICE

FREDERICK W. REYNOLDS, OF GRANTWOOD, NEW JERSEY, ASSIGNOR TO AMERICAN TELEPHONE AND TELEGRAPH COMPANY, A CORPORATION OF NEW YORK

ELECTROOPTICAL TRANSMISSION

Application filed December 4, 1926. Serial No. 152,656.

This invention relates to electro-optical transmission and electron discharge devices, and more particularly to means for controlling the intensity of an electronic beam employed for scanning.

In accordance with this invention, a Braun tube modified in two principal respects is used at the transmitter for scanning. One modification consists in substituting an auxiliary electrode of thin transparent film platinum or other suitable material for the usual fluorescent screen, thus forming an electrically conducting and light transmitting electrode. A second modification consists in positioning immediately in front of the auxiliary electrode, a specially constructed multiple unit photoelectric element, whose function is to control the density or power of the cathode rays or beam within the tube.

As a receiving element it is preferred to use a modified Braun tube as disclosed in A. McL. Nicolson, Patent No. 1,470,696, dated October 16, 1923. This comprises a grid positioned between the cathode and the anode.

Features of this invention, as will appear from the following detailed description and the appended claims, are per se of general application in the arts utilizing electron discharge devices.

Figure 1 is a general schematic embodiment of a transmitting apparatus of this invention.

Fig. 2 is a general schematic embodiment of receiving apparatus which may be used with the transmitting apparatus shown in Fig. 1.

Fig. 3 is a diagrammatic drawing of a simple optical arrangement for focusing an image of the object on the transmitting tube.

Where similar reference characters appear, similar parts in the different figures are designated.

The modified Braun tube 10 of the transmitting apparatus shown in the schematic drawing Fig. 1 consists of an enclosing glass tube having a hot cathode 11, a beam focusing anode 12, two sets of electrostatic beam deflecting or directing plates 13, 14, 15 and 16, a multiple unit photo-electric element 17 comprising a large number of fine tubular units, and a light transmitting and electrically conducting auxiliary electrode 18 within the large end of the enclosing tube just in front of the element 17 where the image of the picture to be transmitted is focused. The photo-electric element may be made of a large number of closely compacted relatively fine and long glass or quartz tubes, as many tubes being necessary as are desired to divide the image into elements. The tubes may be held in position with some opaque cement, such as alundum, which also serves the purpose of preventing light from being reflected from one unit into adjacent ones. A film of rubidium, potassium, or other photoactive material is deposited on the inner walls of these tubular photoelectric units. The auxiliary electrode 18 may be a light transmitting conducting film of platinum on the inner side of one end of the tube 10, or on a separate transparent plate within the tube or it may be in the form of an open mesh screen of fine wires. When light impinges upon or an image of an object is focused at the ends of the photoelectric units adjacent to the auxiliary electrode, a part of the light falls upon the photoactive material within the photoelectric units. Cathode rays impressed upon the opposite end of the photoelectric units in any suitable manner are modulated or have their intensity changed in passing through the photoelectric units approximately in proportion to the intensity of the light falling upon a unit of the photoelectric element through which the cathode rays may be passing. A pulsating current flowing between the cathode 11 and the auxiliary electrode 18 will, therefore, be obtained from such a modified Braun tube upon scanning the photoelectric elements by a cathode beam or rays, which current has a frequency equal to the elementary frequency of scanning and a varying amplitude proportional at any instant to the light falling upon the element being scanned.

The filament 11 is heated by any suitable source of electric current such as the battery 20 and its temperature is controlled by the rheostat 21. The plate circuit of the tube is energized by a source of potential, such as the battery 22. The conductor 23 permits a variable positive potential to be applied to the anode 12. The conductors 24 and 25 leading to and from the apparatus immediately connected with the tube afford a connection of variable potential from the battery 22 to the auxiliary electrode 18. When the tube is energized, the electron flow within the tube takes place from the cathode 11 to the auxiliary electrode 18, passing through the anode 12 which assists in concentrating it into a beam, and between the directing plates. The beam directing electrodes 13, 14, 15 and 16, upon having an electrical potential applied thereto, direct the path of the beam the same as in a standard Braun tube. It is, therefore, obvious that by the proper application of potentials to the electrostatic directing plates, the cathode beam may be deflected to cause it to impinge on or scan any elemental area or unit of the photoelectric element 17. Magnetic deflecting means may obviously be used instead of the electrostatic means.

As the photoelectric element 17 permits the passage of cathode rays or electrons substantially in proportion to its light activation, and consequently the current which the cathode beam can pass at any instant depends upon the illumination to which a unit in the photoelectric element 17 through which it is passing is subjected, the current at any instant in the output circuit of this tube will, therefore, be substantially proportional to the illumination of an elemental area of the picture focused upon the photoelectric element of the tube.

The output circuit connects with the necessary apparatus for transmitting the photoelectric currents over any desired circuit or channel which is shown in the drawing as a radio channel. The transmitting apparatus includes such units as a modulator 30, an oscillator 31 for providing a carrier current, a filter 32, an amplifier 33 and an antenna 34 such as is used for substantially distortionless radio transmission.

In operating the tube in an electro-optical transmitting system, the cathode beam is caused to analyze an image of the object by successively scanning the elemental areas of the photoelectric element 17 under the influence of an electrostatic or magnetic field. As shown in the drawing, an electrostatic field is used and proper direction of the beam is caused by applying two alternating current voltages of different frequencies and proper wave shape to the deflecting plates 13, 14, 15 and 16 within the tube 10. The scanning beam may be made to follow a spiral path as disclosed in A. McL. Nicolson Patent No. 1,470,696, dated October 16, 1923, or a series of substantially parallel paths over a rectangular area or any other suitable path. The arrangement shown herein of applying to the electrostatic beam directing plates two alternating currents of different frequencies and having suitable wave shapes causes the scanning of a rectangular area in substantially parallel lines. The varying voltages are applied to the beam directing plates by means of the low and the high frequency alternators 40 and 50, respectively. These alternators are preferably of the inductor type as indicated in the drawing. The alternator 40 consists of an inductor 41 having a small number of poles and a stator 42 on which is wound the armature and field exciting coil 43. The field excitation may be supplied by any suitable source and connected in series with the source is the inductance 44 which substantially suppresses the passage of alternating current and permits the coil 43 to serve as both field and armature winding. Separate coils, however, may be used for the armature and for the field windings. The armature winding 43 is connected to the potentiometer 45 for adjusting the voltage impressed on the output circuit. Conductors 46 and 47 connect the output of the alternator 40 with the electrostatic plates 14 and 13, respectively. The alternator 50 is somewhat similar to the alternator 40 but the former is designed to generate a current of very much higher frequency. Its inductor 51 has a correspondingly larger number of poles than the inductor 41. The stator 52 carries the armature and field winding 53. Field exciting current is supplied by any suitable direct current source through the choke coil 54 which prevents passage of alternating currents through the exciting circuit. The terminals of this alternator are connected to potentiometer 55 which in turn connects through the leads 56 and 57 with the electrostatic plates 16 and 15, respectively. The rotors of the two alternators are driven at a substantially uniform speed by a LaCour motor 60 or other suitable means. The rotating parts are all mounted upon the common shaft 39.

The LaCour motor may be of the usual type consisting of an armature 61 and field magnets 62, 63, 64 and 65 energized by a suitable source of current 66 which is intermittently applied through the contacts 67 and 68 and the contacting member 69 attached to the tuning fork 70. The tuning fork 70 is operated by means of the magnet 71, the battery 72, the contact 73 and the contacting member 74 attached to the tuning fork. The tuning fork causes the LaCour motor to operate at substantially constant speed as is well known in the art.

The transmitting and receiving apparatus must be operated in synchronism and in proper phase relationship and one way of accomplishing this is by means of a control circuit at the transmitting station governed by the tuning fork 70. The tuning fork is caused to modulate a carrier current generated by an oscillator 80. This may be effected by the contacts 81 and 82 associated with the tuning fork. The modulated output of the oscillator 80 passes through a suitable filter 83 and to the output amplifier 33 and to the antenna 34. The carrier frequencies for picture transmission and for synchronizing, as generated by the oscillators 31 and 80, respectively, are suitably chosen to avoid interference.

At the receiving station the variable current from the sending station is used to vary the intensity of a beam of cathode rays in a modified Braun tube which has a grid between the cathode and the anode. The beam of cathode rays, whose equivalent current density is controlled by the grid, is caused to scan a fluorescent screen in synchronism and in phase with the scanning at the transmitting station. The intensity of fluorescence caused by the cathode rays is substantially proportional to the equivalent current density of the stream, and a visible image, of the object whose light effects are scanned at the transmitting station, results. The use of such a hot cathode Braun tube for television reception is described in A. McL. Nicolson Patent 1,470,696, dated October 16, 1923.

The receiving apparatus shown in Fig. 2 is in a number of respects similar to the transmitting apparatus shown in Fig. 1. It consists of a modified Braun tube 110 which in general outward appearance resembles the transmitting modified Braun tube 10, shown in Fig. 1. The photoelectric element 17 and the auxiliary electrode 18 shown in Fig. 1 are omitted from the receiving tube, and in place of the latter the receiving tube has its large end or a suitable member coated with a material 119 which becomes fluorescent upon being subjected to cathode rays. In operation, the cathode beam generated within the receiving tube is caused to pass over the fluorescent material 119 in exact synchronism and in phase with the scanning beam of the transmitting tube, thus reproducing an image of the picture being scanned by the transmitting apparatus. The picture transmission currents and the control currents are both received by the antenna 134 and amplified by the amplifier 133 and then separated by the filters 132 and 183, the picture currents passing through the former and the control currents through the latter.

The picture current modulated carrier wave, upon passing the filter 132, is detected by the detector 130 to produce the picture currents which are supplied to the grid circuit of the receiving tube 110. The receiving tube has a hot cathode 111 and a beam directing anode 112 similar to those in the transmitting tube, but with a grid 117 positioned between the cathode and the anode. The cathode filament is heated by means of any suitable source, such as the battery 120, and its temperature is controlled by the rheostat 121. The adjustable positive potential applied to the anode 112 is obtained from any suitable source such as the battery 122. The electrostatic beam controlling plates 113, 114, 115 and 116 are arranged substantially the same as in the transmitting tube and are connected to alternating current generators 140 and 150 which are identical with the corresponding ones at the transmitting station. The LaCour motor 160 drives both alternators through a common shaft 139 in synchronism and in phase with the corresponding alternators at the transmitting station. Synchronism is maintained by means of the control current transmitted to the relay 185 which operates the tuning fork 170 by means of the magnet 171 in circuit with the battery 172 and the contacts 173 and 174 which are controlled by the magnet 185. The contact member 169 on the tuning fork alternately makes contact with the contacts 167 and 168 and thus controls the LaCour motor 160 as is well known in the art.

The currents generated by alternators 140 and 150 cause the cathode beam in the receiving tube 110 to move in synchronism and in phase with that of the cathode scanning or analyzing beam in the transmitting tube 10 and thereby cause the fluorescent screen 119 of the receiving tube to emit light in accordance with the illumination of the object whose image is focused on the transmitting tube. The shaping of the pole-pieces and other details of the alternators, by methods well known to the art, are such that the characteristic of the output current is such that the waves generated cause a substantially uniform scanning of the picture. The alternators 50 and 150 have a frequency, for example, 100 times greater than that of the alternators 40 and 140. This difference in frequency causes the cathode beam to alternate between the electrostatic plates 15 and 16 or 115 and 116, 100 times while one alternation occurs between the electrostatic plates 13 and 14 or 113 and 114. This results in a substantially rectilinear vibratory scanning process covering a rectangular area. However, as already stated, any other suitable movement of the cathode beam may be employed.

A schematic drawing of a simple optical system showing the object to be scanned and the analyzing end of the transmitting tube is shown in Fig. 3. It consists primarily of a lens system for focusing an image of the object at the front end of the photoelectric element 17. The object 200 may be at any suitable distance and by means of the lens 201 an image of the object is focused in proper relation to the transmitting tube. The lens system may be similar to that used in a camera and any inverting or reversing of the image caused by the lens system can be corrected in the system by suitably arranging other elements of the apparatus.

The invention disclosed herein is susceptible to various modifications and adaptations without departing from the scope and spirit of the invention and it is not intended to limit the invention to the specific construction herein shown and described except as defined by the appended claims.

What is claimed is:

1. The method of scanning an image for television purposes which comprises simultaneously producing a plurality of discrete space charges of photo-electrons corresponding respectively to the elementary areas of said image, and causing said space charges to successively vary the impedance to a space current.

2. The method of scanning an image for television purposes which comprises producing a separate stream of photo-electrons for each elementary area of said image, each stream being confined to a definite path and varying in intensity to the corresponding area of the image.

3. The method of scanning an image for television purposes which comprises producing a separate stream of photo-electrons for each elementary area of said image, each stream being confined to a definite path and varying in intensity to the corresponding area of the image, and integrating the effects of said stream to cause said image to be faithfully reproduced at a distance.

4. In an electro-optical transmitting tube, a cathode, means for producing a directive stream of electrons, means for directing said stream of electrons to scan a given area, a plurality of photo-electric units positioned in the path of said electron stream through which said stream passes in succession, each of said photoelectric units causing said stream to vary substantially in proportion to light reaching it, and an auxiliary electrode for collecting the electrons of said stream.

5. In an electro-optical system, an electron emitting cathode, a light transmitting anode, means to cause a beam of electrons from said cathode to scan said anode, means to illuminate said anode, and means to control the intensity of said beam in accordance with light passing through said anode.

6. In an electro-optical system, an electron emitting cathode, a light transmitting anode, means to cause a beam of electrons from said cathode to scan said anode, means to illuminate said anode, an impedance control element in the path of said beam, and means to transmit light to said control element from said anode to control the intensity of said beam.

7. In an electro-optical system, an electron emitting cathode, an anode, means to cause a beam of electrons from said cathode to scan said anode, a modulating member comprising a plurality of insulated sections in the path of said beam, and means to illuminate said modulating member to control the intensity of said beam.

8. In an electro-optical system, an electron emitting cathode, an anode, means to cause a beam of electrons from said cathode to scan said anode, a bank of tubular impedance control elements in the path of said beam, and means to illuminate said impedance control elements to control the intensity of said beam.

9. In an electro-optical system, an electron emitting cathode, an anode, means to cause a beam of electrons from said cathode to scan said anode, a bank of tubular impedance control elements in the path of said beam, a photo-electrically sensitive coating on the inner surface of each of said tubular elements, and means to illuminate said impedance control elements to control the intensity of said beam.

10. In an electro-optical system, an electron emitting cathode, a light transmitting anode, means to cause a beam of electrons from said cathode to scan said anode, means to illuminate said anode, a modulating member comprising a plurality of insulated sections in the path of said beam, and means to transmit light to said modulating member through said anode to control the intensity of said beam.

11. In an electro-optical system, an electron emitting cathode, a light transmitting anode, means to cause a beam of electrons from said cathode to scan said anode, means to illuminate said anode, a bank of tubular impedance control elements in the path of said beam, and means to transmit light to said control elements through said anode to control the intensity of said beam.

12. In an electro-optical system, an electron emitting cathode, a light transmitting anode, means to cause a beam of electrons from said cathode to scan said anode, means to illuminate said anode, a bank of tubular impedance control elements in the path of said beam, a light sensitive coating on the inner surface of each of said tubular elements, and means to transmit light to the inside of said tubular elements through said anode to control the intensity of said beam.

13. In a television system, means to produce a beam of electrons, a light transmitting electrode, means to cause said beam to scan said electrode, means to focus upon said electrode an image of an object corresponding to which image currents are to be produced, a plurality of light sensitive impedance control elements in the path of said beam, said elements receiving light from respective elemental areas of said image to control the intensity of said beam, and means to produce image currents corresponding to the variations in the intensity of said beam.

14. In a television system, means to produce a beam of electrons, a light transmitting electrode, means to cause said beam to scan said electrode, means to focus upon said electrode an image of an object corresponding to which image currents are to be produced, a bank of tubular impedance control elements in the path of said beam, said elements receiving light from respective elemental areas of said image to control the intensity of said beam, and means to produce image currents corresponding to the variations in the intensity of said beam.

15. In a television system, means to produce a beam of electrons, a light transmitting electrode, means to cause said beam to scan said electrode, means to focus upon said electrode an image of an object corresponding to which image currents are to be produced, a bank of tubular impedance control elements in the path of said beam, a light sensitive electron emitting coating on the inner surface of each tubular element, said elements receiving light from respective elemental areas of said image to control the intensity of said beam, and means to produce image currents corresponding to the variations in the intensity of said beam.

In testimony whereof, I have signed my name to this specification this 2nd day of December, 1926.

FREDERICK W. REYNOLDS.